Aug. 6, 1935.  F. C. BUTLER  2,010,136
FRUIT GRADING MACHINE
Filed Oct. 11, 1933  3 Sheets-Sheet 1
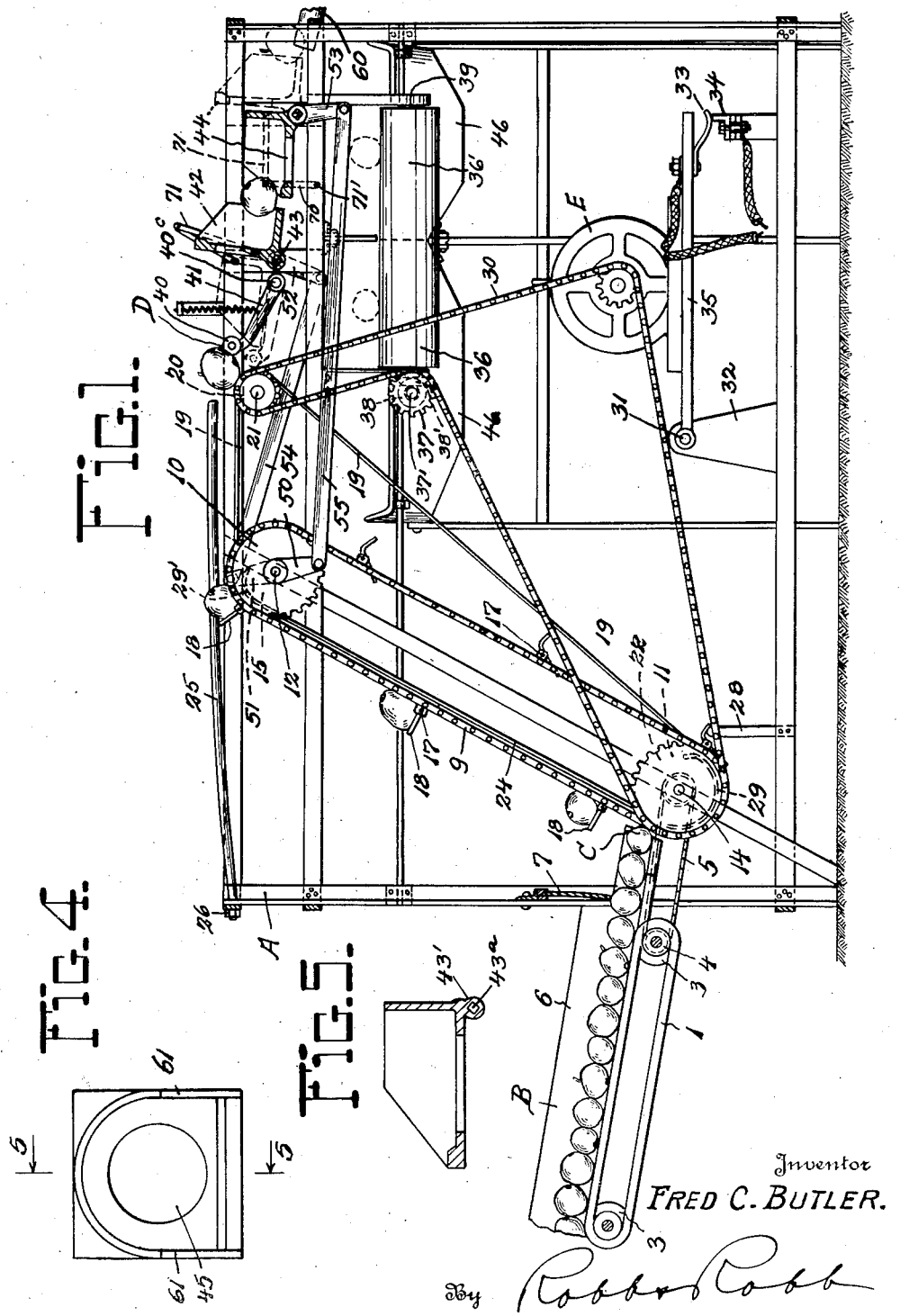
Inventor
FRED C. BUTLER.
Attorneys Aug. 6, 1935.   F. C. BUTLER   2,010,136
FRUIT GRADING MACHINE
Filed Oct. 11, 1933   3 Sheets-Sheet 2
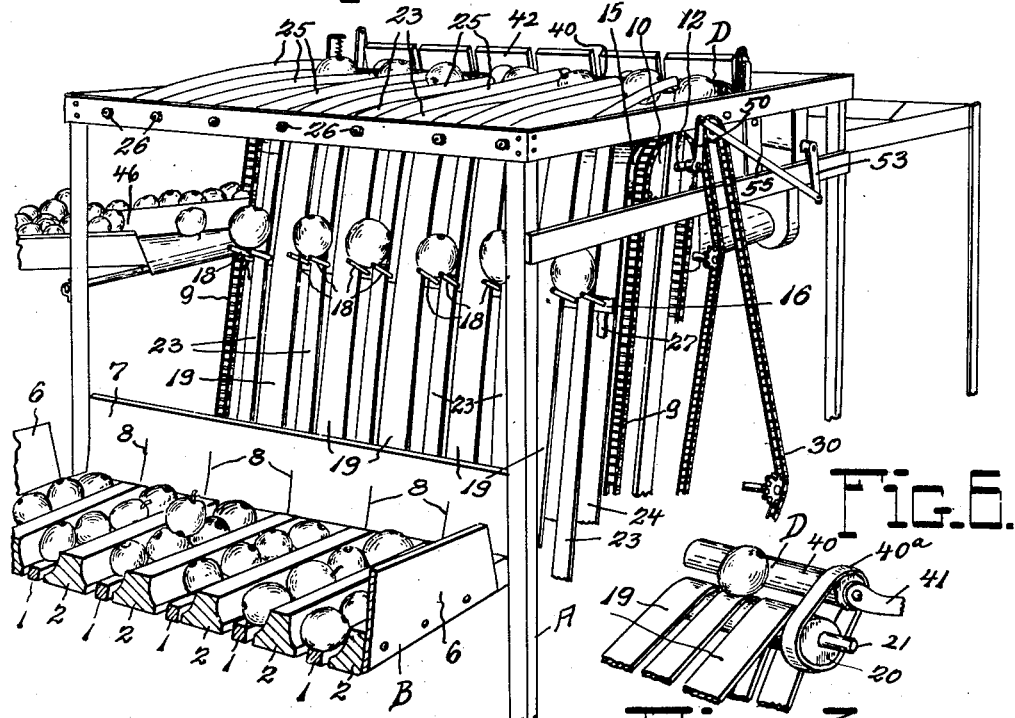
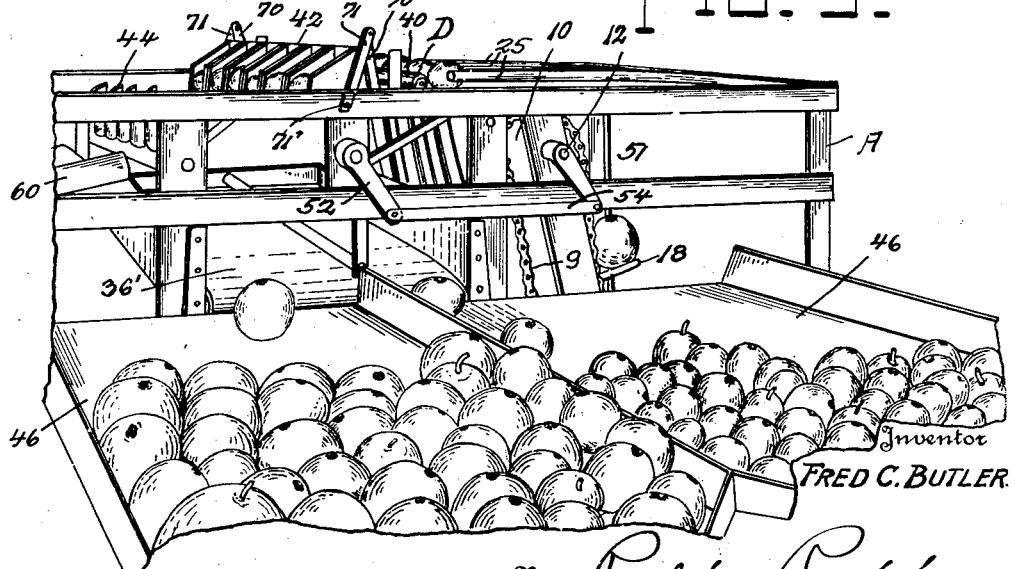
Inventor
FRED C. BUTLER
By Robb & Robb
Attorneys Aug. 6, 1935.  F. C. BUTLER  2,010,136
FRUIT GRADING MACHINE
Filed Oct. 11, 1933  3 Sheets-Sheet 3
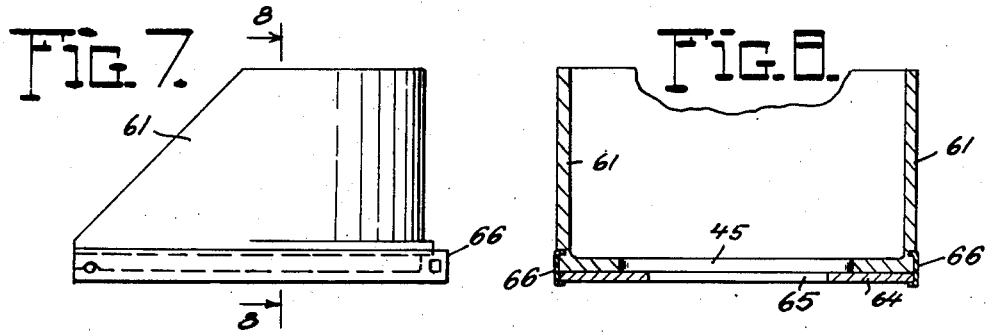
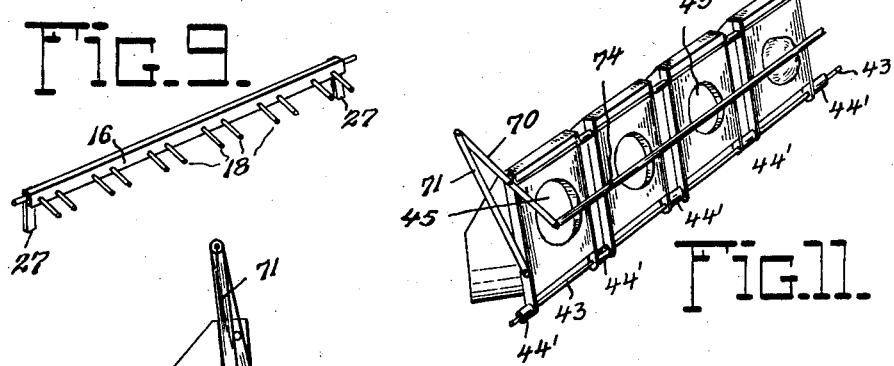
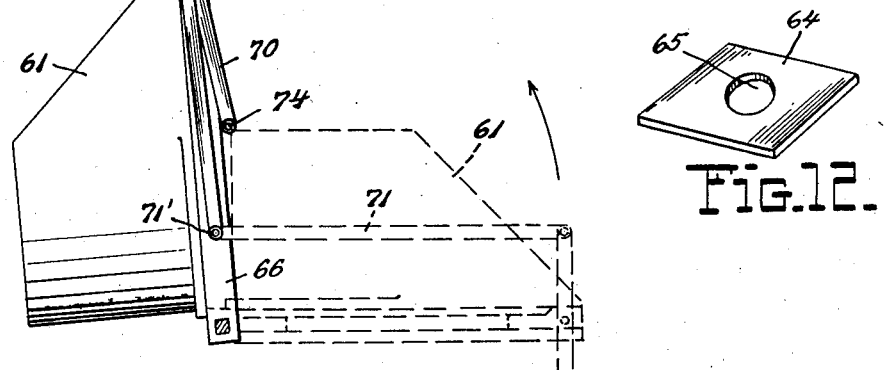
Inventor
FRED C. BUTLER.
By Robert Cobb
Attorneys Patented Aug. 6, 1935

2,010,136

UNITED STATES PATENT OFFICE 2,010,136

FRUIT GRADING MACHINE

Fred C. Butler, Cleveland, Ohio

Application October 11, 1933, Serial No. 693,183

6 Claims. (Cl. 209—71)

This invention relates to a method and apparatus for sorting and/or grading spheroid articles, and is particularly adapted for handling fruit such as apples, oranges, or the like.

This invention is a continuation as to all divisible subject matter of my copending application Serial No. 509,641.

In everyday practice, the sorting and grading of fruit is carried on manually, which, of course, increases the cost to the consumer and also opens the road to bruising the fruit during repeated handling while undergoing this process of sorting. In addition, it is a time-taking process, and speed can only be obtained by putting several individuals on the job, which, as before mentioned, adds to the final cost.

It it my aim to provide an apparatus which may be used in the orchard or at the grading house, for quickly and economically sorting the fruit into groups of uniform size and wherein the method is such that the fruit is moved from zone to zone wherein it receives some particular attention, such as inspection in one zone for imperfections, size gauging in another zone, and segregation in another zone. The apparatus is such that the steps of the process are carried forwardly speedily and without manual intervention, means even being provided to dislodge any of the fruit which might become lodged in some of the parts of the apparatus, so that the fruit may move through the apparatus in a steady procession without interruption arising from this source. Obviously, by the elimination of manual intervention the whole process of sorting will be accelerated with consequent benefit to the owner of the apparatus and subsequent purchaser of the fruit through a reduction in cost.

Other objects and advantageous features of this invention are to be observed from the following detailed description and accompanying drawings, wherein like characters of reference indicate corresponding parts, and wherein—

Figure 1 is a side elevation of the preferred form of my fruit handling apparatus.

Figure 2 is a detail in perspective of the apparatus with certain of the parts removed to more clearly illustrate the apparatus.

Figure 3 is a perspective view of the apparatus taken from the left hand side, showing the sizing cups and the apparatus for operating the same alongside of the grading tables.

Figure 4 is a top plan view of one of the cups for receiving and gauging the fruit.

Figure 5 is a section taken on the line 5—5 of Figure 4.

Figure 6 is a detail in perspective of the apparatus for rotating the article so that the same may be inspected.

Figure 7 is a side elevation of one of the cups employed for gauging the fruit which is adapted to receive a secondary bottom having a gauging opening therein of relatively smaller size so that the size of fruit which the cup gauges may be varied.

Figure 8 is a section taken on the line 8—8 of Figure 7.

Figure 9 is a perspective view of one of the elements employed for lifting the fruit from the zone of supply to the grading table.

Figure 10 is an end elevation of a row of cups disclosing the apparatus which is employed for displacing fruit which may become lodged in the cups.

Figure 11 is a view in perspective of the apparatus shown in Figure 10.

Figure 12 is a perspective view of one of the auxiliary bottom members for the cups of Figures 7 and 8.

Figure 13 is a top plan view of the cup of Figure 7.

Before specifically describing the apparatus which I employ in grading and sorting fruit, I would like to first briefly point out the method which is followed, which will perhaps give a clearer insight into the operation and nature of the apparatus.

It is my intention to deliver apples or other fruit to this apparatus in large quantities and to move the same from some zone of supply gradually to a point where the same are picked up and moved in parallel rows onto an elevated conveyor belt which transports the same to an inspection station where each article is rotated so that it may be looked over to detect imperfections and thrown out if necessary. From this inspection station, the fruit is delivered into a receptacle having a gauging opening therein, through which the fruit, if it is of the correct size, drops onto a conveyor belt from whence it is transferred to a table with other fruit of practically the same size. In the event that the fruit is not of such size as to drop from the gauging opening, it is transferred automatically to a second receptacle having a gauging opening of a size varying from that of the first, through which the fruit may drop on to a second belt which will divert the same onto a table bearing fruit of a size uniform therewith.

The apparatus for accomplishing this is extremely simple and involves a minimum of working parts and consists essentially in a system of conveyors for transporting the articles from station to station, some of the conveyors being of the endless belt type and others of the receptacle type before mentioned.

Referring to Figures 1 and 2, it will be observed that the apparatus is supported, in the main, on a rectangular table-like structure A made up of angle iron bolted or riveted together and having brace rods and auxiliary angles placed so as to strengthen the structure and afford means for mounting the various elements of the fruit handling assembly.

At the left end of Figure 1 is the loading station B which consists essentially in a plurality of endless belt members 1, Figure 2, running between longitudinal guide members 2 that are spaced apart and have opposed curved surfaces forming troughs closely following the contour of the fruit. These belts are trained over rollers 3, Figure 1, the forward roller being driven by a conventional sprocket and chain drive as indicated at 4 and 5, respectively. Side boards 6 are provided to prevent overflow of the fruit that extend forwardly to a transverse head board 7 hung between the frame verticles that is made up preferably of pliable material and is split vertically as at 8 over each trough so as to allow the fruit to pass thereby without injury thereto. This head board also serves to level the fruit in the trough without injuring the same. From Figure 1 it will be noted that the fruit moves by gravity from the head board to a transfer point C where it is picked up on an endless conveyor and elevated to a point where it is delivered to an inspection station D, however, is urged forwardly by the fruit therebehind moving under the influence of the conveyor belts 1. This apparatus for transferring the fruit from station C to station D is shown best in Figures 1, 2, and 9, wherein it comprises spaced driving chain members 9 which are trained around sprocket members 10 and 11, sprocket members 10 being mounted on a transverse shaft 12 and sprocket members 11 journaled on the lower shaft 14. The shafts 12 and 14 carry belt rolls 15 and 22 respectively, hereinafter mentioned. At spaced points along the opposed chain members 9 are secured the devices which serve to pick up the fruit from each of the troughs and transfer a number of the same simultaneously to station D. These members take the form of a transverse bar 16 pivotally suspended as at 17, Figure 1, at spaced intervals from the chains, each of said bars having a plurality of fingers 18 arranged in pairs longitudinally thereof as shown, for receiving the fruit.

Located between each pair of fingers is a relatively wide transporting belt 19 that is trained over the roll 15 and rearwardly over a small roll 20 mounted on the shaft 21 and thence downwardly and over the large bottom roll 22 mounted on the shaft 14. Likewise, a smaller belt 23 is located between each of the fingers of the pair and trained over the roll in the manner just mentioned so that through this assembly a relatively stable support is provided for the fruit so that it will not become dislodged through elevation and further will not become bruised through frictional engagement with non-moving surfaces.

To further stabilize the assembly the carrier 16 rides in its upward travel against a large flat plate 24 located immediately behind the belt members 23 and 19, Figure 2. The fruit is carried upwardly to inspection station D and is carried for a short distance in a straight path in a horizontal plane between a plurality of longitudinal guide bars 25 attached to the forward end of the frame as at 26, the free ends of which are pointed at and lie closely adjacent to station D so as to maintain the fruit in the rows originally established at the loading station.

Owing to the construction of the transverse finger carrying member 16, it tends to tilt about its axis as it is carried downwardly on the back side of the roll 15, and to insure that the same will be properly positioned for picking up fruit at transfer station C, I have provided at the end of each transverse member a lateral extension 27, Figure 1, that engages with an upright member 28 mounted on a lower frame longitudinal which tends to pivot the whole carrier about its axis and bring the extension 27 under the lower end of the plate 24 which is curved at the bottom in the zone 29 as shown. Thus the fruit is moved upwardly from transfer station C to the zone of the roll 15 from whence it is carried on in a horizontal plane by the belt members alone and laterally supported by the guides 25 while the carrier members 16 are returned to transfer station C. The upper end of the large plate is also curved as at 29' so that the member 27 will be held in position until the fruit is moving in a horizontal plane and no further need the assistance of such fingers to elevate the same. As the carrier moves off the curved end 29' of the plate, the same tends to take the position shown on the downwardly moving side of the chain in Figure 1.

The shafts 14, 12, and 21 are all driven from a common source of power E which may be an electric motor through the medium of sprocket members as shown, around which is trained a drive chain 30. A safety feature is embodied in the motor mounting in that its pivotal association 31 with the upright 32 permits the breaking of the contacts 33 and 34, should the mechanism for any reason jam and the continued rotation of the motor shaft tend to raise the bed plate 35. This will be obvious from an inspection of Figure 1.

It is to be observed that the spring contact 33 offers a means for the support of one end of the motor mounting 35 so that no interference will be encountered in the raising of the motor mounting to separate the contacts. It is also of note that the efficiency of the contact between the members 33 and 34 is increased by virtue of the weight of the motor and associated parts when the apparatus is under normal operation.

The chain 30 is also intended to drive the transverse belt roll 36 through the medium of a sprocket 37 and beveled gear 38 on shaft 37' meshing with a beveled gear 38' mounted on shaft 39 which is arranged in suitable brackets on the framework. The belt 36' and its function will be hereinafter mentioned in more detail.

When fruit arrives at station D, its forward motion is arrested through engagement with a roller 40 mounted between the forward ends of a pair of arms 41 journaled on the frame at 40c. The roller is intended to be moved into and out of the path of the fruit incident to the movement of a cup 42 about its axis 43 as will be observed. One of these cups is provided in advance of each moving row of fruit and the roller spans the width of the apparatus so that when the fruit reaches the point D its forward movement is arrested through engagement with the roller 40. However, owing to the fact that the roller 40 is rotated through the belt arrangement 40a, Figure 3, trained over the roll 20, the fruit is rotated so that the surface thereof over its entirety may be observed by the workmen for imperfections.

From station D, where the fruit is inspected, it travels into one of the cups of a row which is arranged transversely across the machine on an axle 43 journaled in the frame as mentioned, for rotative movement therewith. The cup, the general shape of which is shown in Figures 4 and 5, includes bottom members 43' having a square opening 43a by means of which each cup is sleeved in the shaft 43, suitable spacing means 44' being provided to maintain the correct positional relation. As the cup is turned, by means hereinafter described, toward station D, the arm 41 is engaged by the under-surface thereof and moved out of engagement with the fruit which drops into the bottom of the cup or receptacle 42. Now this movement of these cups is in timed relation with the movement of the second row of cups 44 so that fruit may be delivered from cup 42 to cup 44 simply by occasioning a partial inversion of one cup to roll the fruit over into the other cup.

These cups are what I choose to call gauging cups and are the active means for sorting the fruit by size. This is accomplished by having an opening 45 in the bottom of the cup of a predetermined size through which fruit of a diameter slightly smaller than the opening will pass. Now where I provide two rows of cups as at 42 and 44, the row 44 lying in a slightly lower plane than 42, it will be apparent that the size of the opening of the cups in one row will vary over the size of the cups in the other row so that the fruit sorted out by each cup in one row as compared with each cup in the other row will vary as to size. The fruit drops through the opening if it is of the proper size, and onto the conveyor belt 36' from whence it is delivered to troughs or tables 46 located on the left hand side of the apparatus as viewed in Figure 2. These troughs or tables may be slightly inclined so that the fruit will move away from the belt and not become jammed at the point of transfer thereonto.

The mechanism for operating the cups in timed relation with each other consists in a pair of crank arms 50 and 51, Figure 1, the crank arm 50 being located on the near side of the shaft 12 and the crank arm 51 being located on the far side, both being keyed thereto for rotation therewith. Similarly, each cup shaft 43 is provided with a crank arm 52 and 53 respectively, the crank 52 being actuated by the crank 51 through a connecting rod 54 and the crank 53 and crank 50 being connected through a rod 55. It will be observed that the cranks 51 and 50 are located at 180° so that as the shaft 12 is rotated in a clockwise direction, first one cup 42 will be tilted and then the other cup 44 will be tilted and in such timed relation as when the cup 44 is in receiving position, the cup 42 will be in discharging position and when the cup 42 moves to fruit-receiving position at station D, the cup 44 will be discharging fruit which would not pass through the opening thereof, into a trough 60.

The design of these cups 42 and 44 is such that a high side wall 61 is provided so that the fruit cannot escape therefrom until it reaches the proper transfer point. These cups may be made out of heavy rubber, molded into shape, and I have shown a modified form of cup in Figures 7 and 8, wherein an auxiliary bottom member 64 is provided with an opening 65 therein which varies in size over the ordinary opening in the cup so that the "gauge" of the cup may be altered merely by applying this auxiliary bottom, means being provided in the form of small angle members 66 embedded in the cup material in the upper zones for receiving and retaining such auxiliary bottom. The auxiliary bottom is shown removed in Figure 12.

It sometimes occurs that the fruit will become lodged in the gauge opening of the cups which is a condition to be avoided if smooth operation of the machine is to be obtained. I have provided means for dislodging any fruit which shall become so lodged, which is best shown in Figures 10 and 11 as comprising levers 70 pivotally mounted on the end cups of a row of cups by means of a shaft 70' extending through all cups, Figure 11. Lever 70 is pivotally connected at its upper end with members 71 pivoted to the frame at 71'. As the row of cups turns about their axes on the shaft, a transverse rod 74 connected to each of the levers 70 as shown in Figure 11, moves inwardly toward the bases of each cup to strike any fruit which may become lodged in the aperture of the cups. In this manner with this device operating in timed relation with the other movement of the device, as the cups swing toward discharging position, the rod 74 impinges against any fruit held in the openings and causes the same to pass out of the cup.

Obviously, the mechanism just described provides for the continuous feeding and sorting of fruit such as apples or oranges to at least three different sizes, albeit more than two rows of gauge cups may be employed and fruit from the largest to the smallest diameter may be quickly and easily gauged and sorted, not to mention that the fruit is also brought to a station where it may be inspected without manual intervention, which is only necessary to remove imperfect or undesirable fruit.

Having thus described my invention, what I claim as new and desire to secure by Letters Patent of the United States, is—

1. In a fruit grading machine of the class described, in combination, conveyor devices for moving articles of fruit to an inspection station, a roller disposed in the path of movement of such fruit to arrest the movement temporarily at a predetermined point in the travel of the fruit, an instrumentality for rotating said roller to impart corresponding movement of the fruit for inspection while said fruit is arrested in its movement, devices for carrying said roller by which the fruit is arrested in its travel, and a grading member cooperative with the last mentioned devices for actuating the same to discontinue the movement arresting operation of the roller and cause the fruit to be received by the grading member.

2. In a fruit grading machine of the class described, in combination, conveyor devices for moving articles of fruit to an inspection station, a roller disposed in the path of movement of such fruit to arrest the movement temporarily at a predetermined point in the travel of the fruit, an instrumentality for rotating said roller to impart corresponding movement of the fruit for inspection while said fruit is arrested in its movement, devices for carrying said roller by which the fruit is arrested in its travel, a grading member cooperative with the last mentioned devices for actuating the same to discontinue the movement arresting operation of the roller and cause the fruit to be received by the grading member, a grading cup movably mounted adjacent the said arresting roller and having a grading opening therein, and mechanism for causing the grading cup to engage the devices supporting the arresting roller to shift the arresting roller into a cooperative position for arresting the fruit in its movement and to cause the fruit on resuming movement to pass to the grading cup.

3. In a fruit grading machine of the class described, the combination of conveying devices for moving fruit to an inspection station, an arresting device disposed in the path of the fruit for arresting the movement of the latter and including means for imparting movement to the fruit while arrested to facilitate its inspection, and mechanism for shifting the arresting device to a position inoperative to arrest the traveling movement of the fruit whereby the fruit may continue to another station beyond the inspection station.

4. In a fruit grading machine of the class described, the combination of conveying devices for moving fruit to an inspection station, an arresting device disposed in the path of the fruit for arresting the traveling movement of the latter and including means for imparting movement to the fruit while arrested to facilitate its inspection, and mechanism for shifting the arresting device to a position inoperative to arrest the movement of the fruit whereby the fruit may continue to another station beyond the inspection station, the last mentioned mechanism including a grading cup for sizing the fruit, and parts for moving the grading cup to a position effecting abutment with the arresting device to shift the latter to its inoperative position referred to, together with spring means for bringing the arresting device again in the path of the fruit when the abutment action of the cup aforesaid is discontinued.

5. In a fruit grading machine of the class described, in combination, conveyor belts on which articles of fruit are moved to an inspection station, a roller disposed in the path of movement of said fruit adjacent to said belts and common to the belts so that it may engage articles of fruit being moved by all of said belts to said station, arms normally supporting said roller in the path of movement of the fruit so that upon abutment of the roller with the fruit the traveling movement of the fruit will be arrested, drive means for turning said roller to cause rotation of the fruit when it contacts with the roller at the said inspection station, and mechanism for shifting the said arresting roller to a position permitting the fruit to pass the same for further operations thereon.

6. In a fruit grading machine of the class described, in combination, conveyor belts on which articles of fruit are moved to an inspection station, a roller disposed in the path of movement of said fruit adjacent the said belts and common to the belts so that it may engage articles of fruit being moved by all of said belts to said station, arms normally supporting said roller in the path of movement of the fruit so that upon abutment of the roller with the fruit the movement of the fruit will be arrested, drive means for turning said roller to cause rotation of the fruit when it contacts with the roller at the said inspection station, and mechanism for shifting the said arresting roller to a position permitting the fruit to pass the same for further operations thereon, said mechanism including sizing devices comprising grading cups movable into positions to receive the fruit therein when the said arresting roller is shifted to a position permitting the fruit to pass on for further operations.

FRED C. BUTLER.